(12) United States Patent
Khayat et al.

(10) Patent No.: US 12,253,690 B2
(45) Date of Patent: Mar. 18, 2025

(54) BODY PART COMPRISING A LENTICULAR WALL TO FORM A THREE-DIMENSIONAL IMAGE

(71) Applicant: COMPAGNIE PLASTIC OMNIUM, Lyons (FR)

(72) Inventors: Issam Khayat, Sainte-Julie (FR); Vivien Schott, Sainte-Julie (FR); Damien Boisson, Sainte-Julie (FR); Olivier Torres, Sainte-Julie (FR)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 694 days.

(21) Appl. No.: 17/283,451

(22) PCT Filed: Oct. 8, 2019

(86) PCT No.: PCT/EP2019/077245
§ 371 (c)(1),
(2) Date: Apr. 7, 2021

(87) PCT Pub. No.: WO2020/074530
PCT Pub. Date: Apr. 16, 2020

(65) Prior Publication Data
US 2021/0382321 A1    Dec. 9, 2021

(30) Foreign Application Priority Data
Oct. 8, 2018 (FR) .................................. 1859310

(51) Int. Cl.
*G02B 30/10* (2020.01)
*B60R 13/04* (2006.01)
(Continued)

(52) U.S. Cl.
CPC .............. *G02B 30/10* (2020.01); *B60R 13/04* (2013.01); *B60R 19/52* (2013.01); *G02B 3/0056* (2013.01); *G09F 19/125* (2021.05); *G09F 21/048* (2013.01)

(58) Field of Classification Search
CPC ...... G02B 30/10; G02B 3/0056; G02B 30/27; B60R 19/52; B60R 13/04; F21S 43/239;
(Continued)

(56) References Cited

U.S. PATENT DOCUMENTS 7,333,268 B2 * 2/2008 Steenblik ............. B42D 25/378
359/619
2004/0160782 A1 8/2004 Zimmermann et al.
(Continued)

FOREIGN PATENT DOCUMENTS

JP        2010256807 A      11/2010
JP        2013095032 A  *    5/2013
(Continued)

OTHER PUBLICATIONS

International Search Report of International Searching Authority for PCT/EP2019/077245, ISA/EPO, Dated Jan. 2, 2020.
(Continued)

*Primary Examiner* — Ephrem Z Mebrahtu
(74) *Attorney, Agent, or Firm* — M&B IP Analysts, LLC (57) ABSTRACT

Motor-vehicle body part including a lenticular sheet made of transparent molded plastic material of a given refractive index (n) higher than 1 and a given thickness (e), includes an external face forming an array of substantially spherical microlenses of a given radius of curvature (R), said microlenses being arranged with a given pitch and, an internal face of the lenticular sheet, which bears an array of three-dimensional features that are arranged with the pitch of the array of microlenses. This array of features is formed from
(Continued)

fractions of a whole three-dimensional feature of equal dimensions, two adjacent fractions of three-dimensional features being offset in the direction in question by a given phase shift, each of these fractions of three-dimensional features magnified by a given coefficient of magnification, are juxtaposed on the internal face of the lenticular sheet with a pitch corresponding to the pitch of the microlenses.

18 Claims, 9 Drawing Sheets

(51) Int. Cl.
    *B60R 19/52*     (2006.01)
    *G02B 3/00*     (2006.01)
    *G09F 19/12*     (2006.01)
    *G09F 21/04*     (2006.01)

(58) Field of Classification Search
    CPC .... F21S 43/245; F21S 43/26; F21W 2104/00; G09F 19/12; G09F 19/125; G09F 21/048; G03B 25/02; B32B 2307/40; B32B 2451/00; B32B 3/00; B32B 33/00; B44F 7/00
See application file for complete search history.

(56) References Cited

U.S. PATENT DOCUMENTS

| | | |
|---|---|---|
| 2006/0262411 A1 | 11/2006 | Dunn et al. |
| 2016/0018661 A1 | 1/2016 | Otsubo et al. |
| 2016/0101643 A1* | 4/2016 | Cape ..................... G02B 30/27 |
| | | 359/627 |
| 2018/0039089 A1 | 2/2018 | Nakamura et al. |
| 2018/0288387 A1* | 10/2018 | Somanath ............ H04N 13/271 |

FOREIGN PATENT DOCUMENTS

| | | |
|---|---|---|
| WO | 2010057832 A1 | 5/2010 |
| WO | 2016174917 A1 | 11/2016 |
| WO | 2016191321 A1 | 12/2016 |

OTHER PUBLICATIONS

Written Opinion of International Searching Authority for PCT/EP2019/077245, ISA/EPO Dated Jan. 2, 2020.

\* cited by examiner

BODY PART COMPRISING A LENTICULAR WALL TO FORM A THREE-DIMENSIONAL IMAGE

CROSS-REFERENCE TO RELATED APPLICATIONS

This application claims priority under 35 U.S.C. § 371 to the International Application No PCT/EP2019/077245, filed Oct. 8, 2019, and to the French Patent Application FR18/59310 filed Oct. 8, 2018, the contents of which are hereby incorporated by reference.

DESCRIPTION

The present disclosure relates to the field of motor vehicles and, more specifically, to the panels forming the body elements.

It is common practice to insert decorative elements into the body panels in order to enhance the aesthetics of the vehicle. These decorative elements can be used to reinforce the lines of the body or even support a logo or a distinctive sign of the make or model of the vehicle.

To reinforce this visual effect, the decorative elements play on the optical properties of the materials of which they are made and can include light sources.

For instance, publication WO 2016174917 describes a sheet, a first face of which supports a plurality of cylindrical lenses and the second face of which, opposite the first face, is a flat surface on which a first image and a second image are printed. The images are arranged so as to create a stereoscopic effect on the plane of the sheet, so that an outside observer located on the side of the first face sees an image appear that is reconstituted in three dimensions.

Similarly, document JP 2010 256807 proposes a plate on which a first face supports a part of a main pixelated intaglio pattern. The other complementary part of the main pattern is formed by relief structures that are arranged on the back surface of the plate so as to produce a moiré pattern on the plane of the sheet for an observer located on the side of the first face.

It is the object of the disclosed embodiments to provide an original alternative solution that makes it possible to display a large-sized three-dimensional relief image.

The body part for a motor vehicle according to the disclosed embodiments comprises a lenticular wall made of transparent molded plastic having a given refractive index of greater than one and a given thickness and comprises an external face and an internal face opposite the external face. This part is characterized in that:
the external face of the lenticular wall forms an array of substantially spherical microlenses having a given radius of curvature and arranged at a given pitch, and
the internal face of the lenticular wall supports an array of three-dimensional patterns that are arranged according to the pitch of the array of microlenses, characterized in that said array of three-dimensional patterns is formed of fractions of an entire three-dimensional pattern of equal dimensions, with two fractions of adjacent three-dimensional patterns being shifted in the considered direction by a given phase shift, and wherein each of these fractions of three-dimensional patterns is enlarged by a given enlargement coefficient and juxtaposed on the internal face of the lenticular wall at a pitch corresponding to the pitch of the microlenses.

By judiciously selecting the radius and the pitch of the microlenses, the pitch and the size of the fractions of relief patterns, and the enlargement and thickness of the part as a function of the refractive index of the transparent material, it is possible to influence the height of the three-dimensional image relative to the body part as well as the size and resolution of the image that is visible to an observer located on the side of the external face of the body part. As will be seen later, the size of the three-dimensional image can be adjusted without it being necessary to increase or decrease the radius of curvature of the microlenses.

The body part according to the disclosed embodiments can comprise, in isolation or in combination, the following features:
A length and a width of said pattern fraction are respectively equal to the pitches of the array of microlenses.
A reduced pitch corresponds to the value of the pitch of the microlenses minus the value of the offset multiplied by the enlargement coefficient.
The body part according to any one of the preceding claims, wherein the three-dimensional patterns form reliefs on the internal face (11) of the lenticular wall (1).
The thickness of the lenticular wall is between 1.5 mm and 5 mm and preferably between 1.5 mm and 3.5 mm.
The radius of the microlenses is between 0.5 mm and 3.5 mm.
The pitch of the array of microlenses is between 0.5 mm and 3 mm.
The microlenses and the array of fractions of three-dimensional patterns have a longitudinal pitch that is different from the transverse pitch.
A height of the three-dimensional image relative to the external face of the lenticular wall is less than or equal to 15 cm and preferably less than 10 cm.
A screen wall with a refractive index lower than the refractive index of the lenticular wall is overmolded on the internal face of the lenticular wall.
The lenticular wall forms an external wall of a closed optical box comprising a light-reflective inner wall.
The lenticular wall is made of a material selected from among: polypropylene, polyethylene terephthalate, polymethyl methacrylate, polycarbonate, polyethylene terephthalate, acrylonitrile styrene acrylate, acrylonitrile butadiene styrene.

BRIEF DESCRIPTION OF THE FIGURES

The disclosed embodiments will be better understood upon examining the enclosed figures, which are provided for the sake of example and are not of a limiting nature.

DETAILED DESCRIPTION

Figures 1, 2, 3:
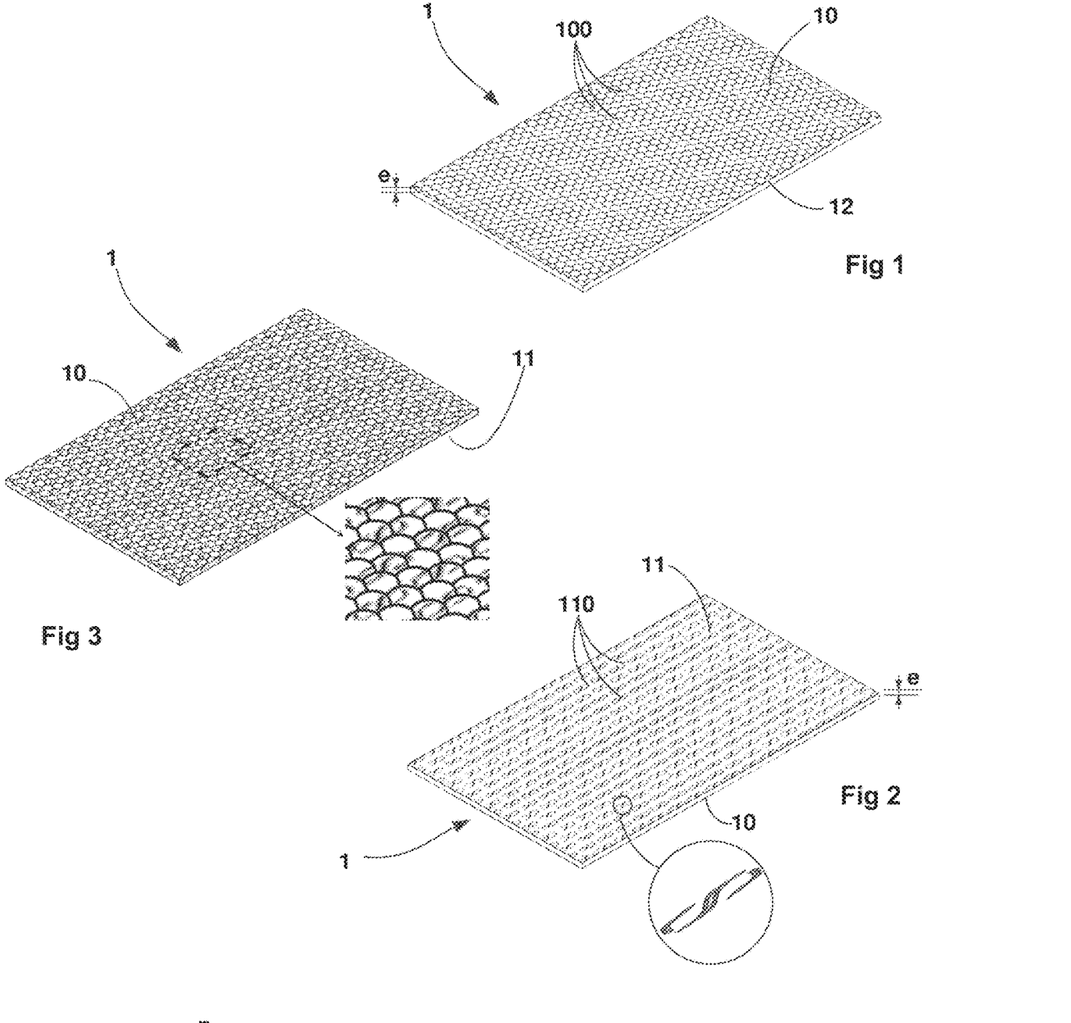
FIG. 1 is a view of the external face of a body part according to the disclosed embodiments.
FIG. 2 is a view of the internal face of the body part.
FIG. 3 is a transparent view of the body part.

FIG. 1 is a schematic perspective view of the external face 10 of a lenticular wall 1 of thickness e. The external face 10 refers here to the external face of the skin of the vehicle that is visible to an observer located outside the vehicle. The external face 10 supports an array of microlenses 100. The microlenses, all identical, have a spherical shape with radius R. The side face 12 is smooth and has no patterns.

FIG. 2 shows the same lenticular wall 1 as seen from the side of the internal face 11. Relief patterns 110, all identical, are arranged in a regular manner. These three-dimensional patterns can be produced equally well in hollow or in relief. In the example that is drawn upon by the present description, these patterns have the shape of a stylized S as illustrated by the inset shown in FIG. 2.

The lenticular wall is made of transparent plastic material of refractive index n. By way of example, materials that exhibit good transparency and may be suitable for this use are: polypropylene, polyethylene terephthalate, polymethyl methacrylate, polycarbonate, polyethylene terephthalate, acrylonitrile styrene acrylate, acrylonitrile butadiene styrene. Each of these materials obviously has a known refractive index which is specific to it.

FIG. 3 and the associated inset make it possible to illustrate the lenticular wall in transparent form by simultaneously showing the array of microlenses 100 and the array of three-dimensional patterns 110.

The pitch separating two microlenses 100 that are juxtaposed in the longitudinal direction will be denoted by $p_1$, and the pitch separating two microlenses 100 that are juxtaposed in the transverse direction is denoted by $p'_1$. As a general rule these two pitches are equal ($p_1=p'_1$).

Figure 4:
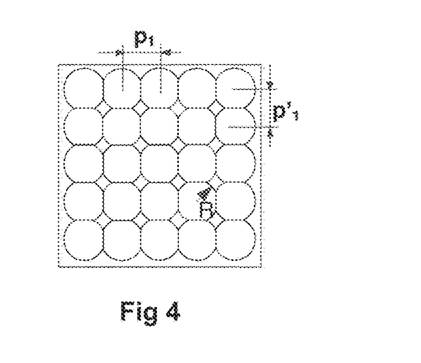
FIGS. 4 and 5 show different layouts of the microlenses on the external face of the body part.

FIG. 4 illustrates a case in which the pitch $p_1$ is equal to the pitch $p'_1$. In the case of this example, the radius R of the microlenses is greater than the pitch $p_1$.

Figure 5:
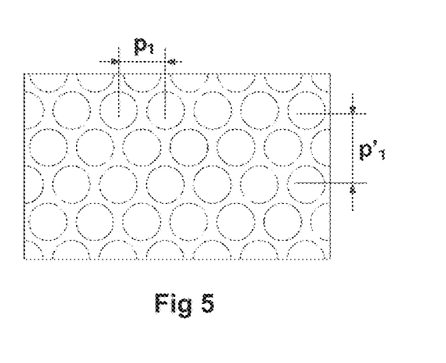

FIG. 5 illustrates a case in which the pitch $p_1$ is less than the pitch $p'_1$ and in which the radius R of the microlenses is less than the pitch $p_1$.

These embodiments of the array of microlenses are not limiting, and all combinations of the illustrated embodiments are also permitted.

The size (the radius R) and the density of the microlenses (the pitch) make it possible to vary the resolution of the three-dimensional image.

Figure 6:
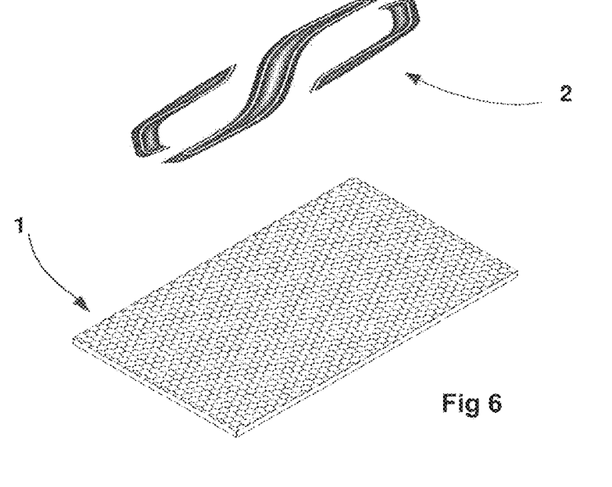
FIG. 6 is a perspective view of the three-dimensional image arranged between the body part and an outside observer.

FIG. 6 illustrates the formation of the three-dimensional image that is obtained by illuminating the lenticular plate with the aid of natural light and is visible to an external observer. In the case of this example, the three-dimensional image is formed between the lenticular wall and the eye of the observer. This will be referred to as a real image.

Figure 7:
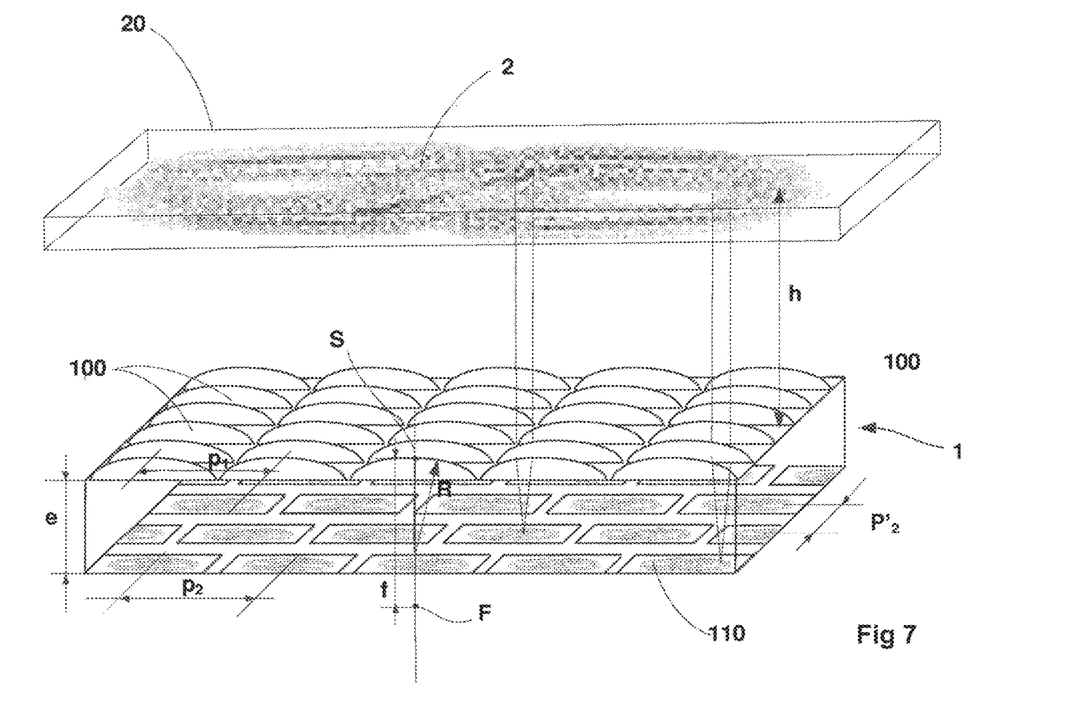
FIG. 7 is a schematic view of the body part and of the associated quantities.

FIG. 7 makes it possible to visualize the main geometric quantities that enable the device to be configured.

The value N represents the number of patterns that are arranged on the internal face in a given (longitudinal or transverse) direction.

The pitch $p_1$ and the pitch $p_2$, respectively, represent the pitch of the microlenses and of the patterns in the same (longitudinal) direction. The value $\Delta p = p_2 - p_1$ expresses the value of the difference between the pitch $p_2$ and the pitch $p_1$ and can have a positive or negative sign. The absolute value of this difference is expressed in the form $|\Delta p|$. The relationship $$\frac{\Delta p}{|\Delta p|}$$

expresses the sign of this difference. The value e represents the thickness of the lenticular wall.

The value $\Gamma$ represents the size of an image in a given direction and is the distance between the two most distant points of the image in that direction. We can therefore have a value $\Gamma$ in the longitudinal direction and a value $\Gamma'$ in the transverse direction. The value of $\Gamma$ is also substantially equal to the size of the lenticular wall, allowing an entire three-dimensional pattern to be imaged in that direction.

R represents the radius of curvature, C the center of curvature, S the apex of the diopter, and F the focal point of a microlens placed at a distance f from the center of curvature S. The set of focal points F of the set of lenses is arranged on the focal plane.

The points A and A', respectively, determine the position of a point object of a 3D pattern arranged on the internal face and the position of this point in the three-dimensional image formed by means of the system.

The height of the image relative to the surface of the lenticular wall is defined by the value h. It should be noted here that the three-dimensional image is also a three-dimensional image that fits into an enveloping box 20.

Figure 8:
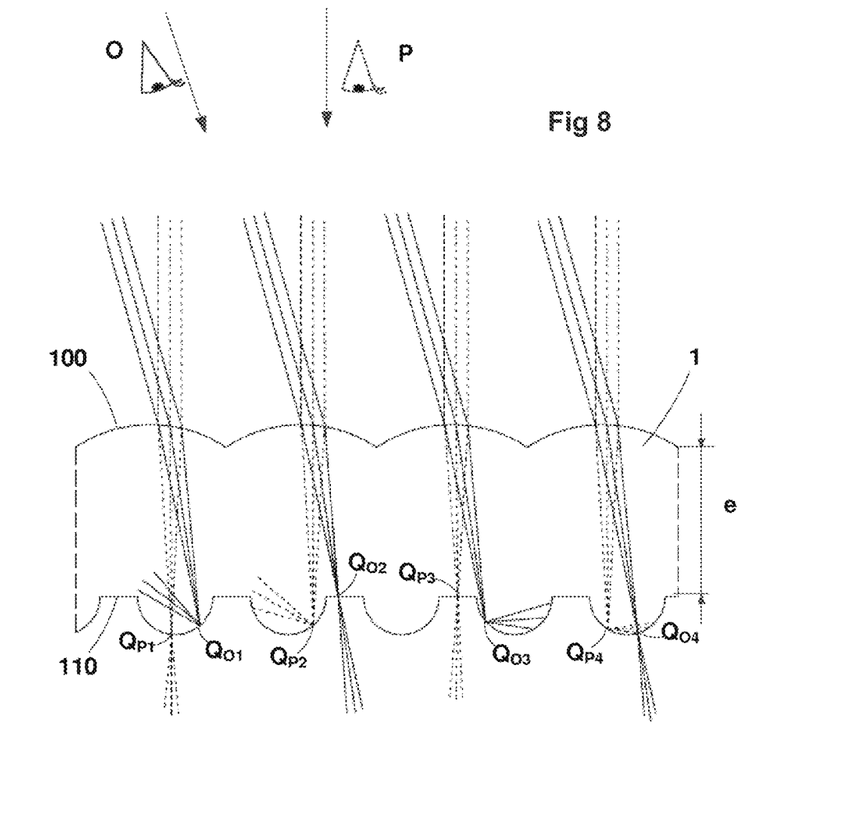
FIG. 8 shows the path of the light rays.

FIG. 8 illustrates the different light paths that can be observed by two observers O and P looking at the lenticular wall from different observation angles.

It should be noted that, according to their angle of incidence with respect to the point of a pattern on which they are projected, some of the rays pass through the lenticular wall, and only some of the rays are reflected. A first observer O, shown in solid lines, will be able to observe the rays reflecting on the patterns of the lower face at the points $Q_{O1}$, and $Q_{O3}$. And an observer P will see the rays coming from the points $Q_{P2}$ and $Q_{P4}$. The rays passing through the points $Q_{P1}$, $Q_{O2}$, $Q_{P3}$, $Q_{O4}$ pass through the lenticular wall and are not visible to either of the observers O or P.

Since this category of ray undergoes total reflection as a function of its angle of incidence on the wall of the three-dimensional pattern, it forms the three-dimensional image in the form of pixels distributed in the image space and visible to the observer.

The offset between the pattern and a lens allows different points of the pattern to be selected.

Figure 9:
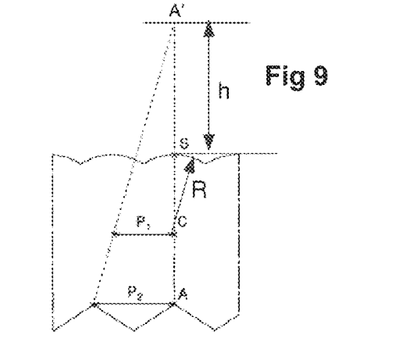
FIGS. 9 and 10 show the positioning of the image as a function of the relative pitches of the lenses and of the patterns.
Figure 10:
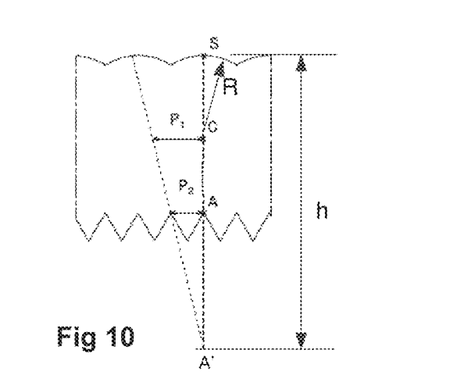

The difference between the pitch $p_1$ and the pitch $p_2$ makes it possible to vary the positioning of the three-dimensional image in space. When the no $p_2$ of the patterns is greater than the pitch $p_1$ of the microlenses ($\Delta p>0$), as is illustrated in FIG. 9, the real (or relief) image is formed above the external face 10, between the observer and the external face. On the other hand, when the pitch $p_2$ is less than the pitch $p_1$ ($\Delta p<0$), as is illustrated in FIG. 10, a virtual (depth) image forms below the internal face 11 of the lenticular wall.

It is also possible to vary the position of the plane containing the focal points of the microlenses in order to obtain a virtual depth image or a real image. When this focal plane is located in the thickness of the lenticular wall, the positions of the real image and of the virtual image are reversed with respect to what is stated in the previous paragraph.

By way of example, for a lenticular wall that is 3 mm thick and whose size is 3 cm×3 cm on the internal face of which the relief patterns are spaced apart by a pitch $p_2$ of 1.25 mm, the radius of the microlenses is 1.06 mm for a real three-dimensional (relief) image located at 4.42 cm from the external face 10 of the lenticular wall 1. When the radius of the microlenses is 1.15 mm, the virtual three-dimensional (depth) image is formed at a height of −4.42 cm from the external face 10. This difference is due to the position of the focal plane, which is located at −2.88 mm from the external face (inside the lenticular wall) in one case and at −3.12 mm from the external face (outside the lenticular wall) in the other case.

When larger images are desired, however, this arrangement results in the production of microlenses having a very large radius of curvature R, which is more difficult to achieve using current manufacturing techniques.

By appealing to the laws of optics, it is possible to define the relationships between the various parameters described above.

To wit, the size of the image can be varied by changing the difference in period between the microlenses and the raised patterns of the internal face.

In the longitudinal direction, the relationship between the pitch $p_1$ of the microlenses and the pitch $p_2$ of the relief patterns is presented in the following form:

$$\frac{1}{p_2} + \frac{\Delta p}{|\Delta p|} \frac{1}{\Gamma} = \frac{1}{p_1} \quad (1)$$

The same relationship (1) applies between the values $p'_1$ and $p'_2$ representing the pitches of the microlenses and of the three-dimensional patterns in the transverse direction:

$$\frac{1}{p'_2} + \frac{\Delta p'}{|\Delta p'|} \frac{1}{\Gamma} = \frac{1}{p'_1} \quad (1)'$$

The relationship between the size $\Gamma$ of the image and the radius of the microlenses is expressed in the form:

$$R = \frac{n-1}{n} \frac{e}{\left(\frac{\Delta p}{|\Delta p|} \frac{p_2}{\Gamma} + 1\right)} \quad (2)$$

This relationship (2) makes it possible to determine the radius of curvature R of the microlenses as a function of the size $\Gamma$ of the desired image, of the pitch $p_2$, and of the refractive index n of the material chosen to make the lenticular wall 1. This radius of curvature R is determined such that the points forming the three-dimensional image are situated two by two at the intersection between pattern/microlens duos.

Taking into account what has been set out previously, the radius of curvature R of the microlenses cannot be too small or too large. Indeed, if the radius of curvature is too large, a lenticular wall is obtained whose external face has a profile that is close to a plane, and if the radius of curvature is too small, an external face is obtained which comprises small and widely spaced-apart lenses. It is therefore necessary to choose a balanced solution in which the radius of curvature of the microlenses is substantially equal to or even slightly greater than the value of the pitch. Likewise, for reasons of feasibility, we limit ourselves to radii with a size of greater than 0.5 mm.

In practice, for lenticular walls that are suitable for mounting on a motor vehicle, the value of the radius of curvature R of the microlenses varies from 0.5 mm to 3.5 mm, and the pitch $p_1$ of the microlenses varies between 0.5 mm and 3 mm.

If one wishes to determine the thickness e of the lenticular wall as a function of the pitch of the three-dimensional patterns $p_2$ of the refractive index n and the radius R of the microlenses, we obtain a relationship of the type:

$$e = \frac{n}{n-1} R \left(1 + \frac{\Delta p}{|\Delta p|} \frac{p_2}{\Gamma}\right) \quad (3)$$

At constant pitch, the thickness e of the plate is substantially proportional to the radius of curvature R. This amounts to saying that, when the thickness e is increased, the size of the microlenses is also increased in order to obtain a quality three-dimensional image. In practice, the thickness e of the lenticular wall is between 1.5 mm and 5 mm and preferably between 1.5 mm and 3.5 mm.

The height h is expressed as a function of the refractive index n of the thickness e of the lenticular wall 1, of the desired size of the three-dimensional pattern $\Gamma$ and of the pitch $p_2$ of the microlenses as follows:

$$h = \frac{\Delta p}{|\Delta p|} \frac{\Gamma}{p_2} e \left(1 - \frac{n-1}{n} \frac{1}{\frac{\Delta p}{|\Delta p|} \frac{p_2}{\Gamma} + 1}\right) \quad (4)$$

or, with reference to FIG. 9 or 10, when it is desired to express the height h of the three-dimensional image as a function of the pitches $p_1$ and $p_2$ of the thickness of the lenticular wall and of the radius R, the relationship is of the type:

$$h = -\left(\frac{e-R}{p_2}\right)\left(\frac{1}{p_2} - \frac{1}{P_1}\right)^{-1} \quad (5)$$

The height h of the plane of the three-dimensional image is then substantially inversely proportional to the pitch. It should be noted, however, that the more the height h of the three-dimensional image increases, the greater the size $\Gamma$ of the three-dimensional pattern increases, and the more the quality of the image deteriorates due to a pronounced pixelation of the points forming the latter. We will therefore limit ourselves to a three-dimensional image whose size Γ is substantially equal to the dimension of the lenticular wall.

As an example, in order to obtain a large three-dimensional image for a lenticular wall made of methacrylate with an index n equal to 1.586, and for a wall measuring 30 cm×30 cm on which the microlenses of the external face have a radius of 0.8 mm and are arranged at a pitch $p_1$ of 0.5 mm, equal to the pitch $p_2$, the thickness e is equal to −2.16 mm, and the three-dimensional image is arranged at a height of 81 cm from the external face 10 of the lenticular wall 1.

Also, it is preferable to determine the parameters of the lenticular wall in such a way that the height of the image relative to the outer face 10 of the lenticular wall 1 is not too great and does not exceed 15 cm and is preferably less than 10 cm.

In obtaining these low values for h, a tendency of the radius R of the lenses to decrease below the feasibility limits is observed.

One way to get around this difficulty consists in placing on the internal face 11 only the useful part of the pattern under each of the microlenses so as to enlarge the pattern while retaining the optical properties that would be present at a defined pitch and for a given thickness e. It is thus possible to enlarge the pattern while keeping the optical properties that would be present at a defined pitch and at a defined thickness.

Figure 11:
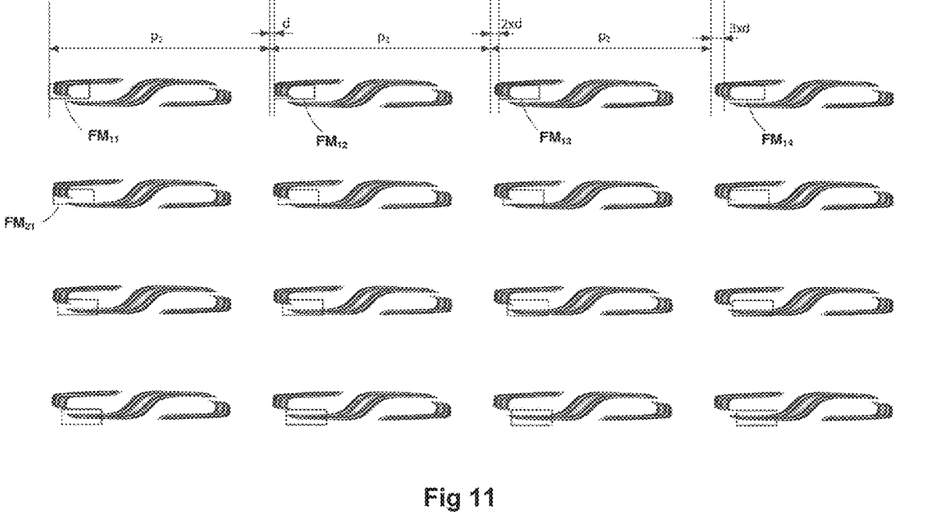
FIGS. 11 and 12 are schematic representations of a first mode for selecting the pattern fractions of the body part.

To do this, with reference to FIG. 11, we consider, in a given (longitudinal or transverse) direction, an array of N whole patterns of pitch $p_2$, and we select a pattern fraction $FM_{11}$ of a given pattern. We then select a pattern fraction $FM_{12}$ of equal size in the pattern adjacent to the previous pattern by shifting the selected pattern fraction by a value $p_2+d$, where d represents a given phase shift. We thus obtain N pattern fractions ($FM_{11}$, $FM_{12}$, $FM_{13}$, $FM_{14}$) representing images that are out of phase with one another by a value d. These pattern fractions then partially overlap.

We proceed in the same manner with the patterns $FM_{11}$, $FM_{21}$. disposed at the pitch $p'_2$ in the transverse direction.

Figure 12:
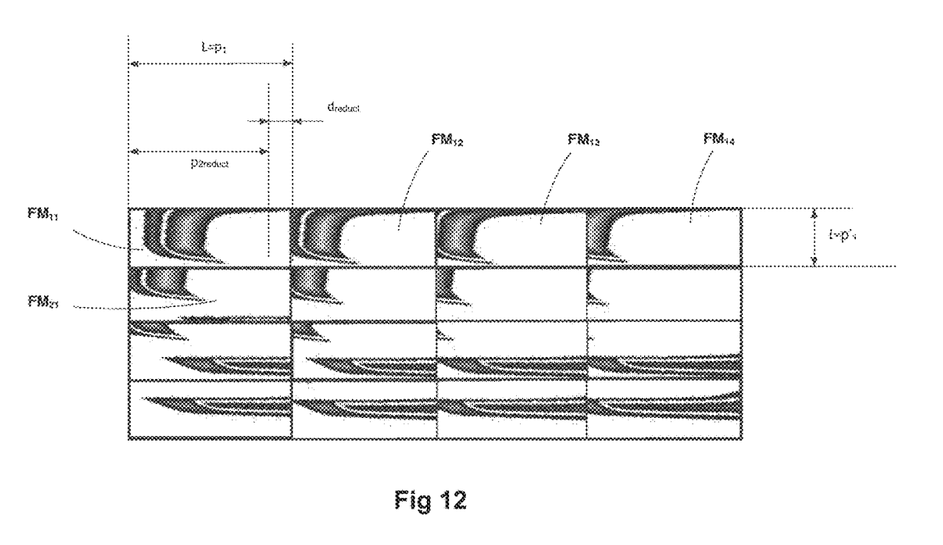

Each of these pattern fractions is enlarged by an enlargement coefficient K, so that, by juxtaposing the pattern fractions, they are arranged according to the pitch $p_1$, corresponding to the pitch of the microlenses 100 as shown in FIG. 12.

The length L of the enlarged pattern is then equal to $p_1$, and the width I of the enlarged pattern is then equal to $p'_1$. Each enlarged pattern is thus placed in line with a microlens.

The enlargement coefficient K therefore depends directly on the pitch $p_1$ and on the chosen size of the pattern fractions.

An array of fractional patterns is then reconstructed on the internal face 11 of the lenticular wall by juxtaposing the enlarged pattern fractions at a pitch $p_1$, corresponding to the pitch of the microlenses 100 as illustrated in FIG. 12.

Figure 13:
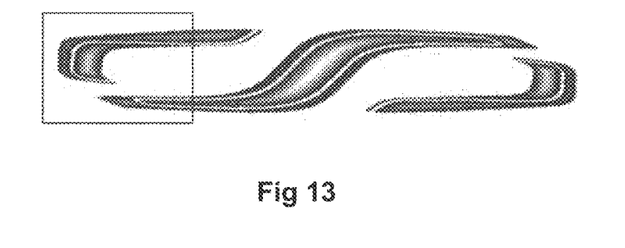
FIGS. 13, 14, and 15 are schematic representations of a second mode for selecting the pattern fractions of the body part.
Figure 14:
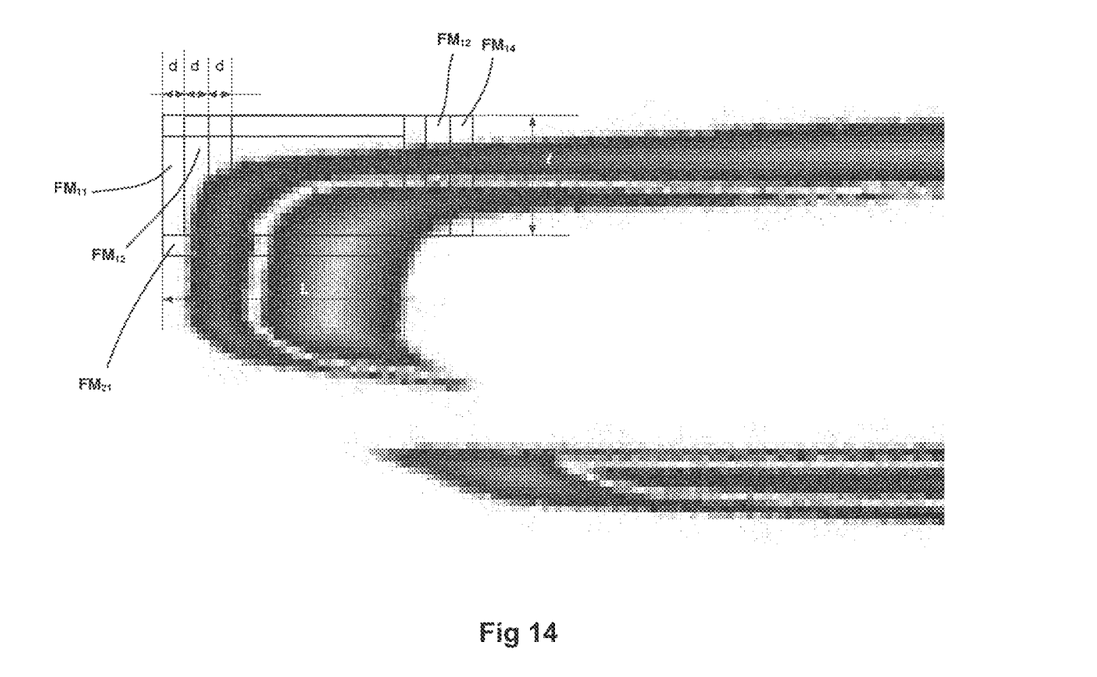
Figure 15:
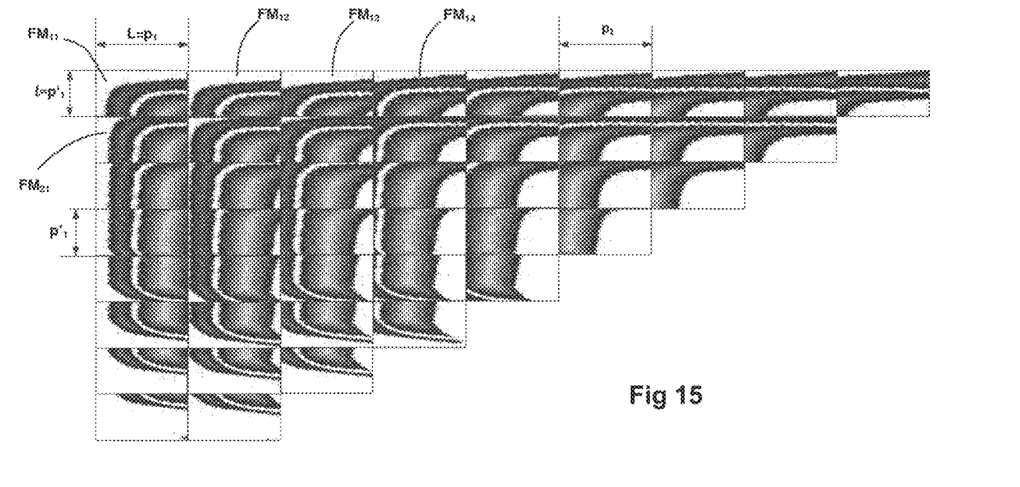

Likewise, it is equally possible to take an enlarged image of the three-dimensional pattern as illustrated in FIG. 13 and select pattern fractions $FM_{11}$, $FM_{12}$, $FM_{13}$, $FM_{14}$, $FM_{21}$, whose length L and width I correspond to the pitch $p_1$ and $p'_1$ of the array of microlenses as illustrated in FIG. 14. The pattern fractions are then juxtaposed as illustrated in FIG. 15.

Figure 16:
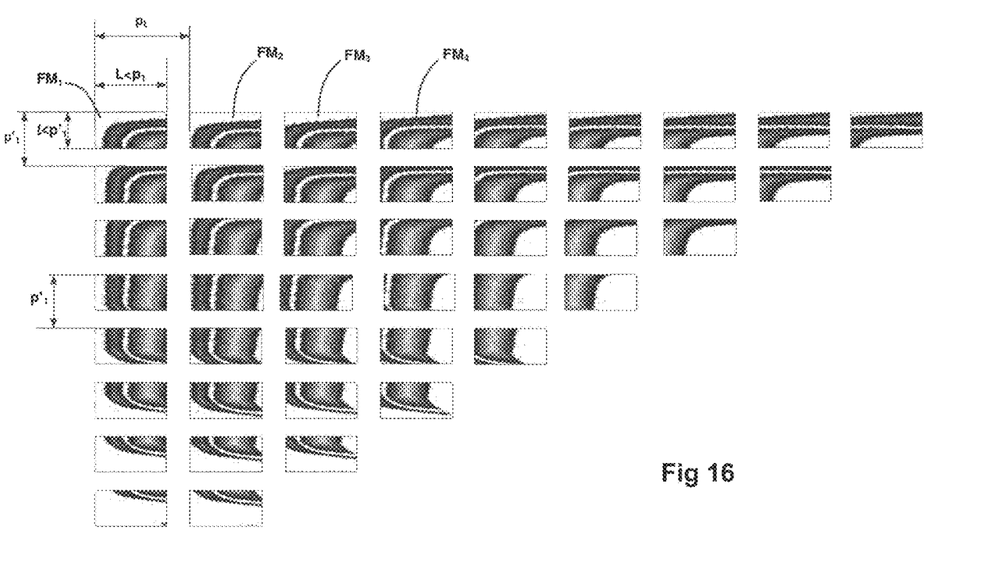
FIG. 16 is an alternative embodiment of the arrangement of the pattern fractions.

It is also quite possible to place pattern fractions on the internal face 11 whose length L and width I are less than or greater than the pitches $p_1$ and $p'_1$ of the array of microlenses. It is then important to arrange these image fractions according to the pitches $p_1$ and $p'_1$. The image fractions can then be disjointed as shown in FIG. 16, or they can overlap partially (not shown).

We then deduce a reduced pitch $p_{2reduct}$, comparable to a fictitious pattern pitch, corresponding to the value of the pitch $p_1$ minus the value of the offset multiplied by the enlargement coefficient K ($p_{2reduct}=p_1-Kd$).

This reduced pitch is also expressed in the form:

$$(N-1)p_{2_{reduct}} = N_{p_2} + \frac{\Delta p}{|\Delta p|}Qp_2 - \left(\frac{\Delta p}{|\Delta p|}+1\right)p_2$$

The value of $d_{reduct}$ is then easy to calculate: $d_{reduct}=p_1-p_{2reduct}$.

When the value of $d_{reduct}$ is positive, a three-dimensional depth image is obtained, and when the value of $d_{reduct}$ is negative, a three-dimensional relief image is obtained.

The advantage of this method is that formulas (1), (2), (3), and (4) apply identically by replacing the value of $p_2$ with $p_{2reduct}$.

The value of the height h can then be calculated in a simple manner using the relationship.

$$h = -\left(\frac{e-R}{p_2}\right)\left(\frac{1}{p_2}-\frac{1}{p_1}\right)^{-1} \quad (5)$$

Thus, at an equivalent microlens radius R, the height h is reduced in proportion to the coefficient K. Unlike the previous method in which the array of patterns consists of a repetition of entire patterns, all identical, arranged at a pitch $p_2$ that is different from the pitch $p_1$, it is the value of the phase shift d between two successive patterns that makes it possible to form the three-dimensional relief or depth image. If the viewing angle increases, an image jump occurs and the three-dimensional image shifts sharply.

On the other hand, this type of arrangement reduces the depth and the relief effect of the three-dimensional image.

Quite obviously, these provisions apply, as before, indistinctly in the longitudinal direction or in the transverse direction.

Unlike the method described above, in which an identical pattern is reproduced on a large scale, there is a jump between two images. If the viewing angle increases so much that the lens begins to image the adjacent pattern, there is an image jump and the three-dimensional image shifts sharply. This effect is not very sensitive for a large K coefficient (greater than 2). This is also the case if each of the shifted images arrives in both eyes.

It bears mentioning here that each pattern fraction is a unique pattern and that it is therefore necessary to create them one by one on the part of the mold that is used to form the lower face 11. Also, computer-controlled engraving devices are used in order to ensure the consistency of the position and shape of the patterns.

The portion of the pattern located at the center of the three-dimensional image must be perfectly aligned with the microlens corresponding thereto, so that the three-dimensional image is correctly centered.

In choosing a construction of the array formed from pattern fractions, it is then possible to obtain values for h that lie between 2 cm and 15 cm for a real relief image, or between −2 cm and −15 cm for a virtual depth image.

The modification of the size of the three-dimensional image can be achieved by judiciously adjusting the size of the enlarged image.

And it is possible to go from a real image to a virtual image by simply changing the thickness e of the lenticular wall 1, which is relatively easy to achieve, while keeping a lenticular array 100 unchanged.

FIGS. 17 to 20 illustrate particular embodiments of the disclosed embodiments.

Figure 17:
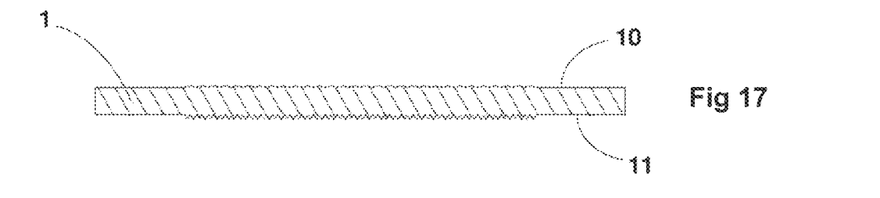
FIG. 17 is a sectional representation of a first embodiment of the body part.

FIG. 17 illustrates a first embodiment of the disclosed embodiments in which the lenticular wall is installed on the vehicle without additional mounting. However, this lenticular wall has the drawback that the rays which pass through the wall (see FIG. 8) can be reflected by objects located behind the lenticular wall, allowing the observer to view internal parts of the vehicle.

Figure 18:
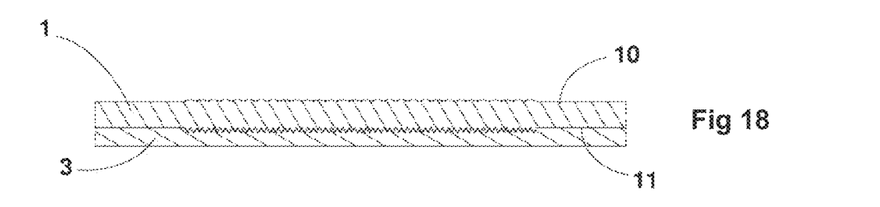
FIG. 18 is a sectional representation of a second embodiment of the body part.

It is the object of the second embodiment illustrated in FIG. 18 to eliminate this drawback.

To this end, a screen wall 3 of refractive index n' that is less than the refractive index n of the lenticular wall (n'<n), is overmolded on the internal face 11 of the lenticular wall 1. The relief patterns arranged on the internal face 11 of the lower face appear recessed in the face of the screen wall that is in contact with the internal face 11 of the lenticular wall. These first two embodiments of the disclosed embodiments are suitable for making a three-dimensional image appear under the lighting of an external light such as daylight.

It is the object of the following embodiments of the disclosed embodiments to produce a three-dimensional image in low light conditions, for example in night driving conditions.

Figure 19:
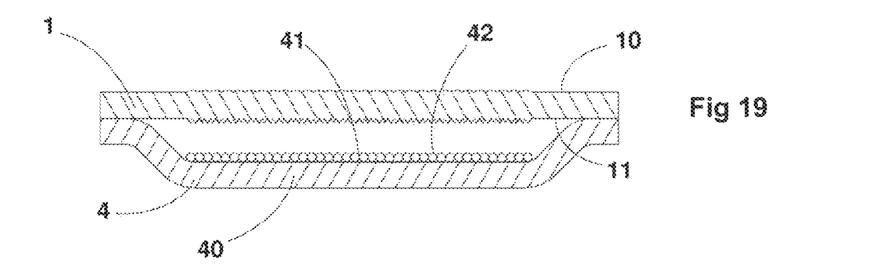
FIG. 19 is a sectional representation of a third embodiment of the body part.

A third embodiment of the disclosed embodiments, which is illustrated in FIG. 19, provides for placing the lenticular wall 1 on an optical box 4 comprising a wall 40 that is made of a material that does not allow light to pass through.

The interior face 41 of the wall 40 opposite the internal face 11 of the lenticular wall 1 can comprise a light-reflective coating or a light-emitting sheet 42 that covers the surface located in line with the internal face 11 of the lenticular wall 1 supporting the array of three-dimensional patterns 110.

This light sheet may consist of optical fibers or of a diffusing optical light guide or waveguide connected to a light source.

Here, light guide or waveguide is understood to refer to a transparent or translucent part inside which light rays move in a common general direction from a first end of the guide comprising an entry surface near which one or more light sources are arranged to an exit surface from which the light rays emerge. The propagation of the light inside the light guide occurs through successive internal reflections of the light rays on the internal reflection faces of the light guide.

Diffusing light guide is understood to refer to a light guide in which the light output surface is formed by a lateral face of said light guide. For a diffusing light guide having a circular cross section, such as an optical fiber, the light emerges from the light guide in a substantially radial direction. A diffusing light guide thus makes it possible to distribute a substantially constant light flux at any point on the exit surface of the diffusing portion of the guide.

The surface of the fiber or of the light guide that is regarded as the exit surface is treated so as to make it rough. The roughness features then constitute so many reflective surfaces, allowing part of the light to escape from the light guide to the outside.

It is therefore conceivable to treat the inner surface 41 of the box 4 so as to obtain an optical box that acts as a diffusing light guide.

Figure 20:
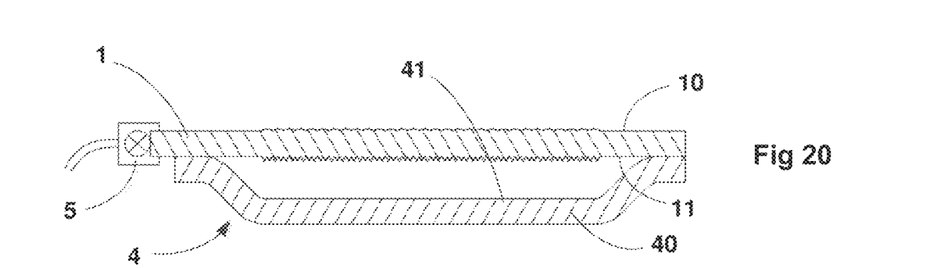
FIG. 20 is a sectional representation of a fourth embodiment of the body part.

The fourth embodiment of the disclosed embodiments, which is illustrated in FIG. 20, makes a provision that the lenticular wall itself acts as a diffusing light guide by taking advantage of the roughness present on the internal face 11 of the lenticular wall, whereupon the light is returned by the internal face 41 of the wall 40 of the optical box.

Figure 21:
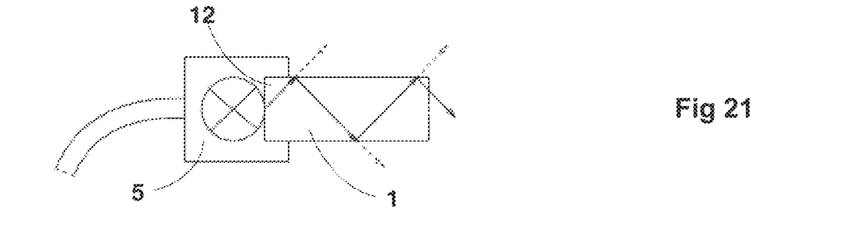
FIG. 21 shows detail of the device according to the fourth embodiment of the body part showing a lighting device arranged along a side face of the lenticular wall.

The light source 5 is disposed along a side face 12 of the lenticular wall 1. It can be composed, for example, of a plurality of light-emitting diodes or even of a diffusing light guide of the type described above and connected to an eccentric light source. FIG. 21 illustrates the circulation of light rays in the lenticular wall 1.

Figure 22:
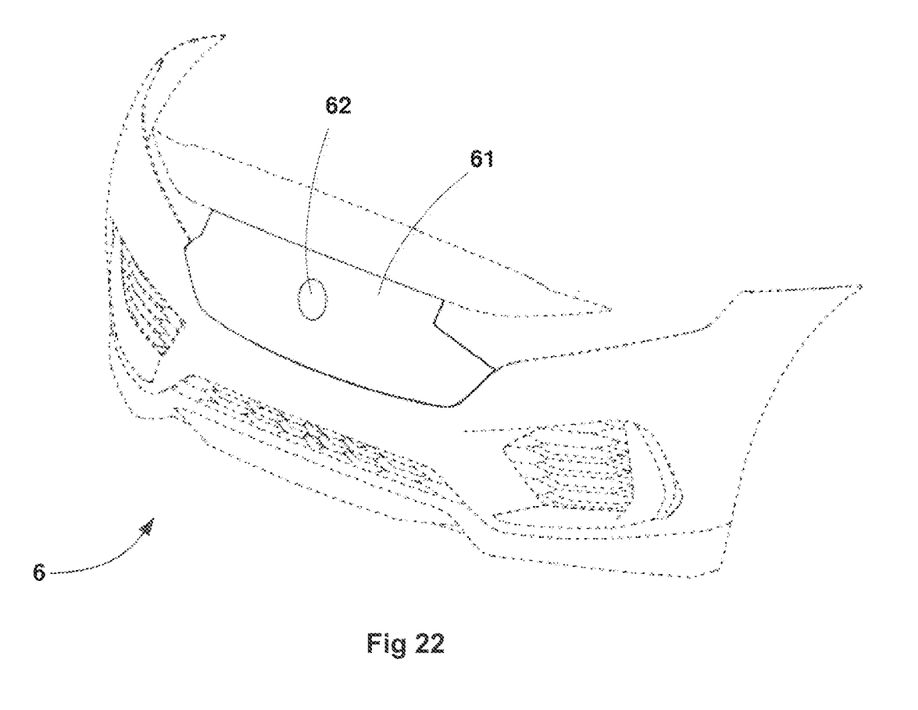
FIG. 22 shows a front part of a vehicle comprising a grille on which a body part according to the disclosed embodiment is disposed.

FIG. 22 illustrates, by way of example, an advantageous use of a body part of the type of the disclosed embodiments.

The front part 6 of the vehicle supports a grille 61 in the center of which is installed a body part 62 comprising a lenticular wall 1 according to the disclosed embodiments. For example, the three-dimensional image represents the logo of the trademark, which appears in relief (or in depth) relative to the surface of the grille.

Figure 23:
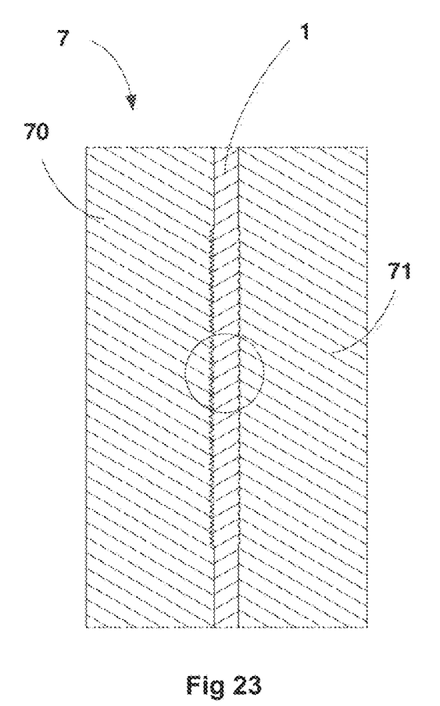
FIGS. 23 and 23a illustrate the method for manufacturing a body part according to the first embodiment.
Figure 23A:
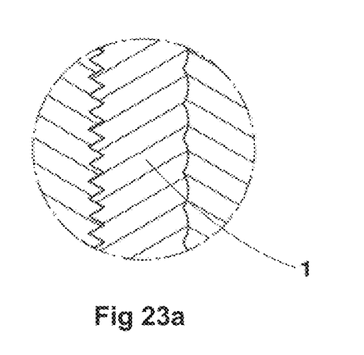

The manufacture of a lenticular wall according to the disclosed embodiments is illustrated in FIGS. 23 and 23a. An injection mold 7 is preferably used which comprises a movable part 71 bearing the imprints of the array of microlenses and a fixed part 70 on which the three-dimensional patterns are engraved. The use of a computer-controlled laser engraver makes it possible to obtain satisfactory results particularly when small-sized patterns that are all different from one another are desired.

The array of three-dimensional patterns 110 thus appears in relief on the internal face 11 of the lenticular wall 1.

Figure 24:
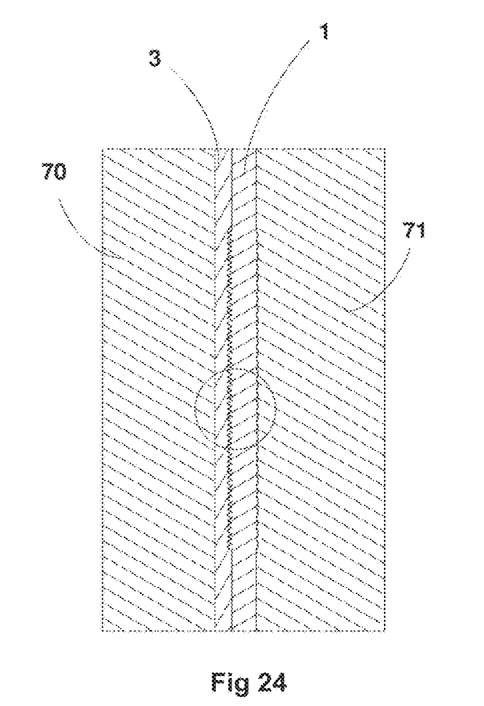
FIGS. 24 and 24a illustrate the method for manufacturing a body part according to the second embodiment.
Figure 24A:
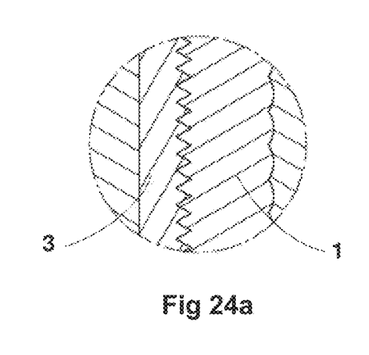

In order to obtain a body part comprising a screen wall 3 as illustrated in FIG. 18, it is necessary to proceed in two successive steps. During a first step, the lenticular wall 1 is molded. Then, during a second step, the part obtained during the first step is placed inside a second mold and the material forming the screen wall 3 is injected as illustrated in FIGS. 24 and 24a.

The optical box 4 is manufactured using methods that are also known to those skilled in the art. The assembly of the lenticular wall 1 on the optical box 4 can be done by gluing, by welding, or by any fixing means that makes it possible to join the lenticular wall and the optical box 4 together.

NOMENCLATURE

1 Lenticular wall.
10 External face of the lenticular wall.
100 Microlenses.
11 Internal face of the lenticular wall.
12 Lateral face of the lenticular wall.
110 Three-dimensional patterns.
2 Three-dimensional image.
20 Enveloping box of the virtual three-dimensional image.
3 Screen wall overmolded on the internal face of the lenticular wall.
4 Optical box.
40 Wall of the optical box.
41 Internal face of the lower wall.
42 Light-emitting sheet.
5 Light emitter/Light-emitting diode.
6 Front of vehicle.
61 Grille.

62 Body part.
7 Injection mold.
70 Fixed part.
71 Mobile part
40 Light-emitting sheet.
e Lenticular wall thickness.
$p_1$, $p'_1$ No microlenses on the external face.
$p_2$, $p'_2$ No patterns on the inside.
$p_{2Reduct}$ Reduced pitch of the patterns of the internal face.
$FM_{11}$, $FM_{12}$, $FM_{13}$, $FM_{14}$, $FM_{21}$ Pattern fractions.
d Phase shift of the pattern portions.
K Enlargement coefficient.
N Number of patterns in a (longitudinal or transverse) direction.
n Refractive index of the lenticular plastic wall.
n' Refractive index of the protective wall.
R Microlens radius.
C Center of curvature of a microlens.
S Top of the diopter of a microlens.
A Position of the object.
A' Position of the image.
Γ Size of a three-dimensional pattern.
h Height between the external face and the plane of formation of the three-dimensional image. O, P Observers.
Q Intersection points of the light beam with the patterns of the internal face.

The invention claimed is:

1. A body part for a motor vehicle, comprising:
a lenticular wall made of transparent molded plastic having a given refractive index (n) of greater than 1 and a given thickness (e), wherein the lenticular wall comprises an external face and an internal face opposite the external face, wherein:
the external face of the lenticular wall forms an array of substantially spherical microlenses having a given radius of curvature (R) and arranged at a given pitch (p1, $p'_1$), and
the internal face of the lenticular wall supports an array of patterns arranged according to the pitch of the array of microlenses, wherein said array of patterns is formed of pattern fractions ($FM_{11}$, $FM_{12}$, $FM_{13}$, $FM_{14}$, $FM_{21}$) of a whole pattern of a three-dimensional image, wherein each pattern fraction is an equal sized fraction fractions of the whole pattern of the three-dimensional image, wherein adjacent pattern fractions of the array of patterns have equal sized fractions of the whole pattern of the three-dimensional image that are offset in a direction considered by a given phase shift (d, d') in the whole pattern of the three-dimensional image, and wherein the each pattern fraction of the array of patterns is enlarged by a given magnification coefficient (K), and the pattern fractions ($FM_{11}$, $FM_{12}$, $FM_{13}$, $FM_{14}$, $FM_{21}$) are juxtaposed on the internal face beyond the lenticular wall at a pitch corresponding to the given pitch (p1, $p'_1$) of the microlenses.

2. The body part according to claim 1, wherein a length (L) and a width (I) of each of said pattern fractions ($FM_{11}$, $FM_{12}$, $FM_{13}$, $FM_{14}$, $FM_{21}$), are respectively equal to the pitches $p_1$ and $p'_1$ of the array of microlenses.

3. The body part according to claim 1, wherein a reduced pitch ($p_{2^{reduct}}$) corresponds to a value of the pitch of the microlenses ($p_1$) minus the value of the offset (d) multiplied by the given magnification coefficient (K).

4. The body part according to claim 1, wherein the array of patterns form reliefs on the internal face of the lenticular wall.

5. The body part according to claim 1, wherein the thickness (e) of the lenticular wall is between 1.5 mm and 5 mm.

6. The body part according to claim 1, wherein the radius (R) of the microlenses is between 0.5 mm and 3.5 mm.

7. The body part according to claim 1, wherein the pitch ($p_1$, $p'_1$) of the array of microlenses is between 0.5 mm and 3 mm.

8. The body part according to claim 1, wherein the microlenses and the array of patterns have a longitudinal pitch ($p_1$) that is different from a transverse pitch ($p'_1$).

9. The body part according to claim 1, wherein a height (h) of the three-dimensional image relative to the external face of the lenticular wall is less than or equal to 15 cm.

10. The body part according to claim 1, wherein a screen wall of a refractive index (n') that is less than the given refractive index (n) of the lenticular wall (n'<n), is overmolded on the internal face of the lenticular wall.

11. The body part according to claim 1, wherein the lenticular wall forms an external wall of a closed optical box comprising a light-reflective inner wall.

12. The body part according to claim 1, wherein the lenticular wall is made of a material selected from any one of: polypropylene, polyethylene terephthalate, polymethyl methacrylate, polycarbonate, polyethylene terephthalate, acrylonitrile styrene acrylate, and acrylonitrile butadiene styrene.

13. The body part according to claim 1, wherein the thickness (e) of the lenticular wall is between 1.5 mm and 3.5 mm.

14. The body part according to claim 1, wherein a height (h) of the three-dimensional image relative to the external face of the lenticular wall is less than 10 cm.

15. The body part according to claim 1, wherein the given magnification coefficient (K) is greater than 2.

16. The body part according to claim 1, wherein a center pattern fraction is aligned with a center microlens of the array of substantially spherical microlenses of the external face, wherein the center pattern fraction is the fraction located at a center of the whole pattern of the three-dimensional image.

17. The body part according to claim 11, wherein the light-reflective inner wall has a diffusing optical light guide connected to a light source.

18. The body part according to claim 1, further comprising:
a light source disposed on a side wall of the lenticular wall, wherein the lenticular wall forms an external wall of a closed optical box, and wherein the internal face of the lenticular wall has a roughness and is configured as a diffusing light guide.

* * * * *